US005399293A

United States Patent [19]

Nunez et al.

[11] Patent Number: 5,399,293

[45] Date of Patent: Mar. 21, 1995

[54] EMULSION FORMATION SYSTEM AND MIXING DEVICE

[75] Inventors: Gustavo Nunez, Caracas; Roger Marin, San Antonio; Maria L. Ventresca, Los Teques, all of Venezuela

[73] Assignee: Intevep, S.A., Caracas, Venezuela

[21] Appl. No.: 978,990

[22] Filed: Nov. 19, 1992

[51] Int. Cl.[6] .......................... B01J 13/00; B01F 15/02

[52] U.S. Cl. .......................... 252/314; 252/312; 366/150; 366/279

[58] Field of Search .............. 252/312, 314; 366/150, 366/279

[56] References Cited

U.S. PATENT DOCUMENTS

| | | | |
|---|---|---|---|
| 3,565,817 | 2/1971 | Lissant | 252/314 |
| 3,684,251 | 8/1972 | Bowling | 252/314 |
| 4,018,426 | 4/1977 | Mertz et al. | 366/136 |
| 4,844,620 | 7/1989 | Lissant et al. | 366/136 |
| 4,934,398 | 6/1990 | Chiniros et al. | 252/314 |
| 5,000,757 | 3/1991 | Puttock et al. | 44/301 |
| 5,147,134 | 9/1992 | Bradley et al. | 366/150 |
| 5,211,924 | 5/1993 | Lee et al. | 366/279 |
| 5,283,001 | 2/1994 | Gregoli et al. | 252/314 |

OTHER PUBLICATIONS

Derwent Abstract AN 85-223315/36 (corresponding to EP-156486-A and US-4,934,398).

Derwent Abstract AN 92-330712/40 (corresponding to US 5,147,134).

*Primary Examiner*—Richard D. Lovering
*Assistant Examiner*—Daniel S. Metzmaier
*Attorney, Agent, or Firm*—Bachman & LaPointe

[57] ABSTRACT

A method for preparing oil in water HIPR emulsions includes the steps of providing a Newtonian liquid including a mixture of a viscous hydrocarbon, an emulsifying additive and water; subjecting the Newtonian liquid to a first shear force whereby a substantial portion of the Newtonian liquid is radially displaced and mixed so as to form a non-Newtonian liquid; thereafter subjecting remaining non-radially displaced Newtonian liquid to a second shear force to mix the remaining non-radially displaced Newtonian liquid into the non-Newtonian liquid to form the HIPR emulsion, which emulsion is a stable oil in water emulsion having a droplet size of between about 1 to 30 microns and having a droplet size distribution (x) no greater than about 1, the droplet size distribution being defined as follows:

$$x = \frac{D90 - D10}{D50},$$

wherein

D90 is a droplet size at least as large as about 90% of all droplets in the oil in water emulsion;

D10 is a droplet size at least as large as about 10% of all droplets in the oil in water emulsion; and D50 is a droplet size at least as large as about 50% of all droplets in the oil in water emulsion.

16 Claims, 2 Drawing Sheets

EMULSION FORMATION SYSTEM AND MIXING DEVICE

BACKGROUND OF THE INVENTION

The invention relates to the field of emulsions and, more particularly, to a method and apparatus for continuous preparation of high internal phase ratio emulsions characterized by small droplet size and narrow droplet size distribution.

In the petroleum industry, problems frequently arise regarding the transportation of crude oils which are viscous when produced and which, therefore, do not flow easily.

Numerous proposals have been made for transporting such viscous crude oils. These include such alternatives as heating the crude oil, adding solvents or lighter crude oils, forming an annulus of water around the crude oil, or forming emulsions of the crude oil in water.

The present invention relates to a method and apparatus for forming emulsions of the crude oil in water to obtain an emulsion which flows easily for conventional transportation. Obviously, such transportation is more efficient when the emulsion formed has a high ratio of internal phase crude oil or hydrocarbon as compared to the external phase of water. Such emulsions are known as High Internal Phase Ratio (HIPR) emulsions and are the further subject of the present invention.

Several devices are known for the preparation of HIPR emulsions. Of these devices, most involve a batch preparation procedure, such as that disclosed in U.S. Pat. No. 4,934,398 to Chirinos et al. In order to improve preparation efficiency, it is desirable to prepare the emulsion in a continuous procedure.

In conventional continuous procedures, however, large amounts of emulsifier and mixing energy are required to produce acceptable results.

For example, U.S. Pat. No. 4,018,426 to Mertz et al. discloses a system for continuous production of high internal phase ratio emulsions. U.S. Pat. No. 4,018,426 teaches that the HIPR final emulsion is formed from a homogeneously mixed preliminary dispersion in a conventional pump which provides shear forces sufficient to create an emulsion. Conventional pumps create flow patterns which vary with the properties of the fluids being emulsified as the fluid emulsifies and becomes non-Newtonian, and can result in non-uniform application of shear forces to the fluids resulting in non-uniform droplet size of the internal phase in the emulsion. Such a non-uniform droplet size has been found to adversely effect the flow characteristics of the emulsion, particularly over time.

Further, when it is desired to prepare an emulsion having relatively small droplet size, conventional pumps must be operated at a shear rate which can cause phase inversion to occur. Such high shear rates consume large amounts of power and require prohibitive amounts of emulsifiers to prevent phase inversion.

Accordingly, it is a principal object of the present invention to provide a system for forming an HIPR oil in water emulsion having a droplet size of between about 1 to 30 microns and having a narrow droplet size.

It is another object of the present invention to form such an emulsion without prohibitive amounts of mixing energy or emulsifiers, and without causing phase inversions.

It is still another object of the present invention to provide such a system which can be used to prepare emulsions having a droplet size of the internal phase less than 7 microns.

Other objects and advantages will become apparent to those skilled in the art after a consideration of the following disclosure.

SUMMARY OF THE INVENTION

The foregoing objects and advantages are obtained by a method for forming an oil in water emulsion which comprises, according to the invention, the steps of forming a Newtonian liquid comprising a mixture of a viscous hydrocarbon, an emulsifying additive and water; subjecting said Newtonian liquid to a first shear force wherein a substantial portion of said Newtonian liquid is radially displaced and mixed so as to form a non-Newtonian liquid; thereafter subjecting remaining non-radially displaced Newtonian liquid to a second shear force to mix said remaining non-radially displaced Newtonian liquid into said non-Newtonian liquid to form said HIPR emulsion comprising a stable oil in water emulsion having a droplet size of between about 1 to 30 microns and having a droplet size distribution (x) no greater than about 1, said droplet size distribution being defined as follows:

$$x = \frac{D90 - D10}{D50},$$

wherein:

D90 is a droplet size wherein about 90% by volume of all droplets in said emulsion are equal to or below;

D10 is a droplet size wherein about 10% by volume of all droplets in said emulsion are equal to or below; and D50 is a droplet size wherein about 50% by volume of all droplets in said emulsion are equal to or below.

According to the invention, the liquid is preferably subjected to said shear forces in a cylinder selected to provide a residence time of between about 1 to 5 minutes and having an inlet for said Newtonian liquid, an outlet for said HIPR emulsion, and a plurality of means for providing shear force to said mixture, said plurality of shear means each having a diameter (d) and said cylinder having a length (L) and diameter (D). According to the invention, a first shear means of said plurality of shear means is positioned at a distance from said inlet of about ⅓L; a second shear means of said plurality of shear means is positioned at a distance from said first shear means of about 1.5d; a ratio of cylinder length to cylinder diameter (L/D) is selected between about 1.5 to 3.0; a ratio of shear means diameter to cylinder diameter (d/D) is selected between about 0.35 to 0.45.

BRIEF DESCRIPTION OF THE DRAWINGS

A detailed description of the preferred embodiments of the invention follows, with reference to the accompanying drawings, in which.

DETAILED DESCRIPTION

Figure 1:
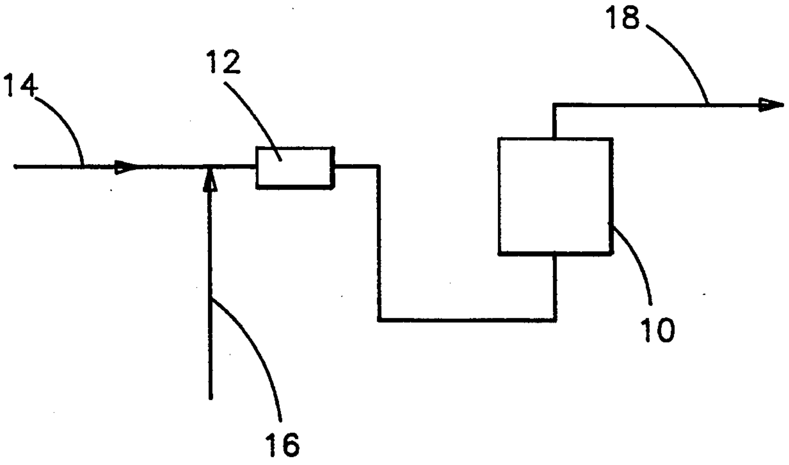
FIG–1 (PRIOR ART)
FIG. 1 is a schematic view of a prior art system for preparing an emulsion.

The invention relates to a method and apparatus for continuous preparation of high internal phase ratio (HIPR) emulsions characterized by small droplet size and narrow droplet size distribution.

Referring to the drawings, a detailed description of the preferred embodiments of the invention will be given.

FIG. 1 illustrates a typical system for preparing HIPR emulsions according to the prior art, which includes a mixing device 10, a static mixer 12, a conduit 14 for an internal viscous hydrocarbon phase and a conduit 16 for an external water phase and emulsifying additive. The conduits 14, 16 join and introduce the internal and external phase to static mixer 12, where the phases are mixed to form a mixture or dispersion which flows to mixing device 10 where the emulsion is formed and is passed on to subsequent processing or storage through outlet 18.

Prior art mixing device 10 is typically a conventional pump which provides a shear force to the dispersion sufficient to form an emulsion of the internal phase in the external phase. Conventional mixing devices 10 typically have a single rotating mixing member or blade, and are sized to provide a residence time for incoming fluids of about 10 seconds. As described above, such devices require high energy and large amounts of emulsifying additive to form HIPR emulsions with small droplet diameters, and frequently cause an inversion of the phases when too much shear is applied. Large amounts of shear are required in conventional mixing devices, however, to obtain HIPR emulsions with droplet diameters less than 7.0 microns. Thus, phase inversions frequently result before the desired droplet size is obtained by such conventional mixing devices.

Also as described above, conventional mixing devices do not apply a substantially uniform shear force to the fluids, resulting in wide droplet size distributions which adversely effect the flow characteristics of the emulsion so formed.

Figure 2:
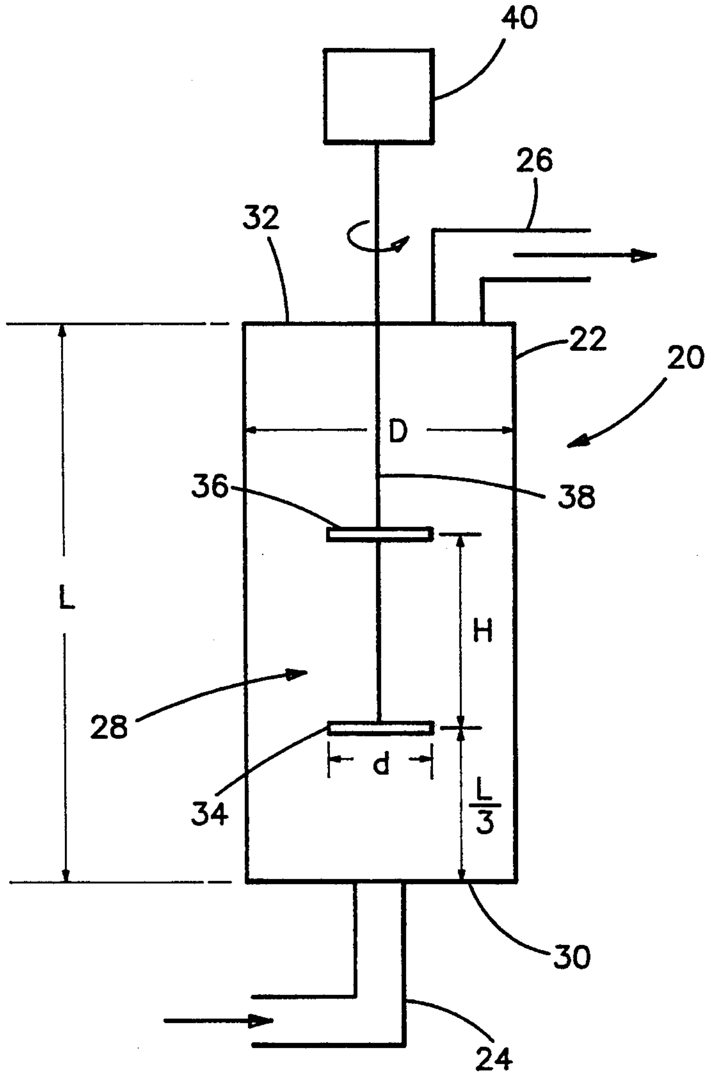
FIG. 2 is a schematic view of a mixing cylinder, according to the invention.

FIG. 2 illustrates a mixing device 20 according to the invention. Mixing device 20 may preferably be disposed in a system such as that of FIG. 1, replacing conventional mixing device 10. Mixing device 20, according to the invention, comprises a cylinder 22 having an inlet 24 and an outlet 26 and a plurality of means 28 for providing shear force which shear means 28 are serially positioned in cylinder 22 along a flow path of the mixture.

Cylinder 22 is preferably oriented substantially vertically, with inlet 24 being located in a bottom surface 30 thereof, and with outlet 26 being located in a top surface 32.

Shear means 28 preferably comprise a plurality of blades 34, 36 serially disposed rotatably, for example on a shaft 38, along a longitudinal axis of cylinder 22. Shear means 28 may alternatively be any structure known in the art to apply shear to flowing fluids, such as vanes, turbines, spiral flow passages, and the like.

Inlet 24 is preferably aligned substantially concentric with the longitudinal axis or shaft 38 of cylinder 22. This alignment helps to direct the mixture to blade 34 in the most effective manner.

Rotation can be imparted to blades 34, 36 through any type of motive means 40 known in the art (schematically depicted in FIG. 2). Motive means 40 preferably imparts rotation to blades 34, 36 so as to subject the mixture being emulsified to shear forces corresponding to a power input of between about $0.1 \times 10^6$ to $1.0 \times 10^7$ Watt.s/m$^3$, so as to form an emulsion having the desired droplet size and droplet size distribution characteristics. The power input varies within the foregoing range as a function of the capacity of the mixing device, that is, the greater the capacity of the mixing device, the greater the power input required to obtain the desired droplet size and distribution.

Cylinder 22 has a geometry which cooperates with size and positioning of shear means 28, according to the invention, to provide thorough mixing of the mixture within cylinder 22, despite changes in thixotropic or rheological properties of the phases to be emulsified. The process begins with a mixture of water, hydrocarbon and emulsifier that is substantially a Newtonian liquid. By Newtonian Liquid is meant a liquid which flows substantially immediately on application of force and for which the rate of flow is directly proportional to the force applied. As the emulsion is formed, the mixture takes on the characteristics of a viscoelastic or non-Newtonian fluid, that is, its viscosity is dependent upon the rate of shear. These changes in properties occur as the emulsion is formed and the incoming Newtonian mixture is transformed into a non-Newtonian emulsion.

The cylinder geometry and shear means arrangement allows the preparation of HIPR emulsions having substantially uniform internal phase droplet sizes in a range of about 1 to 30 microns, and preferably less than about 7.0 microns. Still referring to FIG. 2, the cylinder geometry and shear means arrangements of the present invention will be illustrated.

According to the invention, shear means 28 are positioned serially along the flow path of the Newtonian liquid mixture. This serial positioning is illustrated in FIG. 2 as the serial positioning of blades 34, 36. In operation, first blade 34 radially displaces a substantial portion of incoming Newtonian liquid mixture against the walls of cylinder 22. Preferably, about 80% of the total flow is thus displaced. This portion strikes the walls of cylinder 22 resulting in a minimum pressure at the cylinder wall and a maximum pressure at the tip of blade 34. This results in a further circulation of the liquid being mixed.

As the radially displaced portion of the Newtonian liquid mixture is subjected to shear force and mixed by blade 34, the phases begin to emulsify resulting in a change in properties of the liquid to a non-Newtonian liquid. This non-Newtonian liquid no longer reacts immediately to forces and tends to rigidly rotate about shaft 38.

The remaining non-radially displaced Newtonian liquid, which is not radially displaced by blade 34, flows or climbs up shaft 38, particularly in light of the rigid flow of the mixed non-Newtonian portion. This flow of the remaining portion of Newtonian liquid, up rod or shaft 38, is referred to as "rod climbing" flow.

This remaining portion, if not further subjected to shear forces, would not be mixed as thoroughly as the substantial portion mixed by blade 34. Further, rod climbing flow reduces the overall effectiveness of the mixing. The emulsion so formed would, therefore, have unacceptable droplet size and droplet size distribution characteristics, which could only be improved by increasing the shear rate, thus requiring more emulsifier and increasing the risk of phase inversion.

Thus, according to the invention, blade 36 subjects the remaining non-radially displaced portion of Newtonian liquid to an additional shear force to mix the remaining portion into the non-Newtonian liquid. Rod climbing flow is thus eliminated and an emulsion having desired characteristics is formed without excessive emulsifier or increased risk of phase inversion. Blade 36 also further mixes the rigidly rotating non-Newtonian substantial portion so as to eliminate rigid flow and further increase mixing effectiveness.

With further reference to FIG. 2, the preferred cylinder geometry is expressed in terms of suitable ratios of shear means 28 or blade 34, 36 diameter (d), cylinder length (L) and cylinder diameter (D).

Cylinder 22 preferably has a length and diameter selected to provide a ratio of length to diameter (L/D) of between about 1.5 to 3.0.

Blades 34, 36 are preferably positioned within cylinder 22 at predetermined distances from inlet 24. First blade 34 is disposed at a distance from inlet 24 of about one third of the length of cylinder 22 (L/3). Second blade 36 is disposed at a distance form first blade 34 of about 1.5 times the blade diameter (1.5d). A ratio of blade diameter to cylinder diameter (d/D) is preferably between about 0.35 to 0.45, and is preferably about 0.4.

The aforesaid geometry of cylinder 22 induces a flow pattern in cylinder 22 which is not adversely affected by changes in the rheological or thixotropic properties of the fluid phases being emulsified. Stagnation of flow in cylinder 22 is avoided, as are rod climbing flow and rigid rotation, thus preventing application of non-uniform shear forces to the mixture and preventing the formation of bimodal emulsions, or emulsions having non-uniform droplet sizes.

The cylinder volume is preferably selected, in conjunction with the expected flow rate of mixture, to provide a residence time for the fluids in the cylinder of between about 1 to 5 minutes.

This increased residence time, as compared to that of the prior art, allows the emulsifying additive to adequately disperse the internal phase and stabilize internal phase droplet size without the previously required large amounts of shear force.

The internal viscous hydrocarbon phase and external water phase may preferably be supplied to mixing device 28 through any flow conducting means known in the art such as, for example, conduits 14, 16 as shown in FIG. 1.

The emulsifying additive may preferably be an anionic, cationic or non-ionic surfactant, and more preferably is a nonylphenol ethoxylated surfactant. An example of a suitable emulsifying additive is a composition of 97% by weight of an alkyl phenol ethoxylate based surfactant compound (such as INTAN-100 TM by INTEVEP, S.A.) and 3% by weight of a phenol formaldehyde ethoxylate resin having about 5 units of ethylene oxide.

The emulsifying additive is preferably added to external water phase at a concentration, to viscous hydrocarbon content, of no greater than about 3000 ppm.

The system, according to the invention, operates as follows. The internal viscous hydrocarbon phase and the external water phase and emulsifying additive are supplied by respective conduits, such as conduits 14, 16 of FIG. 1, where a mixture of the phases is formed, preferably in mixing means 12.

Referring to FIG. 2, the mixture then passes to inlet 24 of mixing device 20. The flow of mixture enters cylinder 22 where a substantial portion, preferably at least approximately 80% of the flow, is radially displaced by first blade 34 against the walls of cylinder 22. A static head is provided by the cylinder geometry which promotes recirculation of the fluid and prevents the formation of regions of uneven stress or shear forces, thereby helping to provide a narrow droplet size distribution. The mixing induced by first blade 34 serves to create a non-Newtonian liquid having viscoelastic properties. This results in the liquid rotating around shaft 38 in rigid motion, and causes the remaining portion of Newtonian liquid to flow up shaft 38 in a rod climbing type flow of the liquid.

Second blade 36 serves to eliminate such rod climbing flow by mixing the remaining portion into the mixed non-Newtonian portion and eliminates the rigid flow or rotation of the substantial portion, thus providing improved mixing and an emulsion having the desired characteristics, particularly when a droplet size of 7.0 microns or less is desired.

Second blade 36 thus helps to reduce non-uniformity of droplet size and to provide a narrow droplet size distribution (x), defined as (D90-D10)/D50, which is no greater than about 1, wherein:

D90 is a droplet size wherein about 90% by volume of all droplets in said emulsion are equal to or below;

D10 is a droplet size wherein about 10% by volume of all droplets in said emulsion are equal to or below; and D50 is a droplet size wherein about 50% by volume of all droplets in said emulsion are equal to or below.

Figure 3:
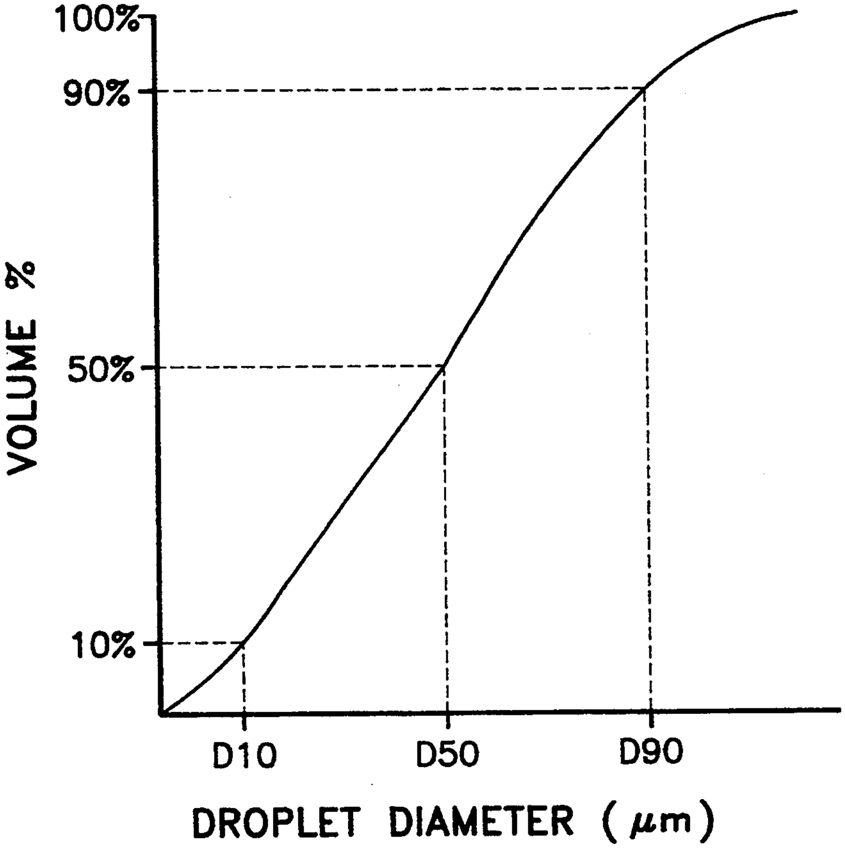
FIG. 3 is a graph illustrating a typical droplet size distribution.

Referring to FIG. 3, an illustration is given to further define the aforesaid droplet size distribution. The y-axis represents the entire droplet family, ordered by increasing droplet diameter. Thus, D10 corresponds to the droplet diameter of the droplet at the tenth percentile along the y-axis. D50 and D90 correspond in the same fashion to the 50th and 90th percentile, respectively. The x-axis represents the droplet size in microns. As FIG. 3 is merely illustrative of the general meaning of the droplet size distribution factor, actual droplet size values are not included on the x-axis. Thus, the droplet size distribution factor as described above is reflective of the uniformity of droplet size contained in the emulsion. A small distribution factor indicates a narrow droplet size distribution and a substantially uniform droplet size.

Several examples follow which compare conventional systems to that of the present invention. The examples were based on the preparation of hydrocarbon-in-water emulsion. The hydrocarbon used was natural Cerro Negro bitumen from the Orinoco Belt in Venezuela and had an API gravity of 8.4 degrees at 60° F. as well as chemical properties as shown below in Table I.

TABLE I

| | BITUMEN CNR |
|---|---|
| Gravity API (60) | 8.4 |
| Saturated % (TLC/FID) | 11.8 |
| Aromatic % (TLC/FID) | 45.8 |
| Resins % (TLC/FID) | 30.9 |
| Asphaltenes % (TLC/FID) | 11.5 |
| Acidity, mgKOH/g (ASTM D-664) | 3.07 |
| Basic nitrogen mg/Kg (SHELL-1468) | 1,546.1 |
| Total nitrogen mg/Kg (ASTM D-3228) | 5,561 |
| Sulphur % | 3.91 |

TABLE I-continued

| | BITUMEN CNR |
|---|---|
| Nickel (mg/l) | 105.9 |
| Vanadium (mg/l) | 544.2 |

The surfactant used was a composition consisting of 97% (weight) of an alkyl of a phenol ethoxylate-based surfactant compound identified as INTAN-100™ supplied by INTEVEP, S.A., and 3% (weight) of a phenol formaldehyde ethoxylate resin having about 5 units of ethylene oxide.

The objective in each example was to obtain an average droplet size of 4 microns or less with a ratio of internal phase to external phase of at least 85:15 and a droplet size distribution factor of 1 or less.

EXAMPLE 1

Viscous hydrocarbon as described above was mixed with water and emulsifying additive in a preliminary static mixer.

The mixture provided by the static mixer was then fed to a conventional dynamic mixer (trademark: TKK, model: PHM, manufacturer: Tokushu Kika Kogyo LTD., Osaka, Japan) at a flow rate providing a residence time of 10 seconds.

With this conventional configuration, at a ratio of internal phase to external phase of 85:15, the smallest droplet size obtained was 8-10 microns. Even with increased temperature and emulsifying additive concentration and reduced ratios of internal phase to external phase, phase inversion occurred before the target droplet size was reached.

EXAMPLE 2

In this example, a premixing tank was substituted for the static mixer of Example 1 to provide a substantially homogeneous preliminary dispersion to the conventional dynamic mixer, as in aforedescribed U.S. Pat. No. 4,018,426. The phases were mixed in the premixing tank for about 30 minutes before passing through the conventional mixer with a residence time of 10 seconds. At an internal phase external phase ratio of 85:15, a droplet size of less than 4 microns was achieved only when emulsifying additive was added in a concentration, to viscous hydrocarbon content, of 6000 ppm and significant amounts of energy were supplied. The results of these tests are summarized below in Table II.

TABLE II

| TEST | SURFACTANT (ppm) | P/Q (Watt · s/m$^3$) | DROPLET DIAMETER (microns) |
|---|---|---|---|
| 1 | 2000 | $1.0 \times 10^8$ | 8.5 |
| 2 | 4000 | $1.0 \times 10^8$ | 5.6 |
| 3 | 6000 | $1.0 \times 10^8$ | 5.0 |
| 4 | 6000 | $1.5 \times 10^8$ | 3.5 |
| 5 | 8000 | $1.0 \times 10^8$ | 3.0 |

Internal phase/external phase ratio: 85:15
Temperature: 66° C.

EXAMPLE 3

Emulsions were formed in a system as in Example 1, but substituting an apparatus according to the invention for the conventional dynamic mixer. The mixer utilized in accord with the present invention had the following dimensions:

D=161 mm
L=495 mm
d=60 mm
H=90 mm
Residence time=4 min.

The test of this system showed a surprising result in that very low droplet size was obtained with only 3000 ppm emulsifying additive at an energy input considerably less than that of Example 2.

At a ratio of internal phase to external phase of 95:5, and a temperature of 66° C., droplet sizes of 4 microns were achieved with 3000 ppm surfactant at $1.5 \times 10^6$ Watt.s/m$^3$. The results of these tests are summarized below in Table III.

TABLE III

| TEST | SURFACTANT (ppm) | P/Q (Watt · s/m$^3$) | DROPLET DIAMETER (microns) |
|---|---|---|---|
| 1 | 3000 | $1.0 \times 10^6$ | 7.0 |
| 2 | 3000 | $1.0 \times 10^6$ | 4.5 |
| 3 | 3000 | $1.5 \times 10^6$ | 4.0 |
| 4 | 3000 | $2.0 \times 10^6$ | 3.5 |

It should be noted that the improved results obtained according to the invention were obtained without the necessity of a premixing tank as in Example 2 and U.S. Pat. No. 4,018,426.

Furthermore, the procedures according to the invention yielded droplet size distribution factors, as described above, of less than 1, indicating a largely uniform droplet size throughout the emulsion.

Emulsions prepared in accordance with the present invention are an excellent alternative for the transportation of viscous hydrocarbons. The emulsion can be broken through known techniques once the emulsion has reached its destination.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for forming an oil in water HIPR emulsion, comprising the steps of:

forming a Newtonian liquid comprising a mixture of a viscous hydrocarbon, an emulsifying additive and water;

subjecting said Newtonian liquid to a first shear force wherein a substantial portion of said Newtonian liquid is radially displaced and mixed so as to form a non-Newtonian liquid;

thereafter subjecting remaining non-radially displaced Newtonian liquid to a second shear force to mix said remaining non-radially displaced Newtonian liquid into said non-Newtonian liquid to form said HIPR emulsion comprising a stable oil in water emulsion having a droplet size of between about 1 to 30 microns and having a droplet size distribution (x) no greater than about 1, said droplet size distribution being defined as follows:

$$x = \frac{D90 - D10}{D50},$$

wherein

- D90 is a droplet size wherein about 90% by volume of all droplets in said emulsion are equal to or below;
- D10 is a droplet size wherein about 10% by volume of all droplets in said emulsion are equal to or below; and
- D50 is a droplet size wherein about 50% by volume of all droplets in said emulsion are equal to or below.

2. A method according to claim 1, further including the step of subjecting said substantial portion of said Newtonian liquid to said second shear force so as to prevent rigid flow of said substantial portion.

3. A method according to claim 2, wherein said steps of subjecting to a first shear force and a second shear force are carried out in a cylinder having a volume selected so as to provide a residence time for said Newtonian liquid in said cylinder of between about 1 to 5 minutes.

4. A method according to claim 3, further including the steps of:

- selecting a cylinder having an inlet for said Newtonian liquid and an outlet for said HIPR emulsion, and having a length (L) and diameter (D), said first and second shear means each having a diameter (d);
- positioning said first shear means at a distance from said inlet of about $\frac{1}{3}$L;
- positioning said second shear means at a distance from said first shear means of about 1.5d;
- providing a ratio of cylinder length to cylinder diameter (L/D) of between about 1.5 to 3.0; and
- providing a ratio of shear means diameter to cylinder diameter (d/D) of between about 0.35 to 0.45.

5. A method according to claim 1, wherein said step of forming said Newtonian liquid includes the step of mixing said viscous hydrocarbon and said water at a ratio by volume of viscous hydrocarbon to water of between about 80:20 to 95:5.

6. A method according to claim 5, wherein said step of forming said Newtonian liquid further includes the step of providing a viscous hydrocarbon having an API gravity of between about 5 to 15 at 60° F.

7. A method according to claim 6, wherein said step of forming said Newtonian liquid further comprises adding said emulsifying additive to said water at a concentration of no greater than about 3000 ppm.

8. A method according to claim 7, wherein said step of adding said emulsifying additive further includes the step of selecting said emulsifying additive from a group consisting of cationic, anionic and non-ionic emulsifiers.

9. A method according to claim 7, wherein said step of adding said emulsifying additive comprises the step of adding a nonylphenol ethoxylate surfactant to said water at a concentration of no greater than about 3000 ppm.

10. An apparatus for forming an oil in water HIPR emulsion from a Newtonian liquid comprising a mixture of a viscous hydrocarbon, an emulsifying additive and water, the apparatus comprising a cylinder defined about a central axis and having an inlet for said Newtonian liquid and an outlet for said HIPR emulsion, a plurality of means for subjecting said Newtonian liquid to shear force positioned serially along a flow path of said Newtonian liquid said plurality of shear means comprising at least a first shear means and a second shear means arranged serially for rotation about said central axis wherein said plurality of shear means being positioned serially within said cylinder along a flow path of said Newtonian liquid, said plurality of shear means each having a diameter (d) and said cylinder having a length (L) and a diameter (D), said first shear means being positioned at a distance from said inlet of about $\frac{1}{3}$L, said second shear means being positioned at a distance from said first shear means of about 1.5d, and a ratio of cylinder length to cylinder diameter (L/D) being between about 1.5 to 3.0, and a ratio of shear means diameter to cylinder diameter (d/D) being between about 0.35 and 0.45, so that a substantial portion of said Newtonian liquid is subjected to a first shear force and radially displaced from said first shear means and mixed so as to form a non-Newtonian liquid, and remaining non-radially displaced Newtonian liquid is subjected to a second shear force and mixed into said non-Newtonian liquid to form an HIPR emulsion comprising a stable oil in water emulsion having a droplet size of about 1 to 30 microns and having a droplet size distribution (x) no greater than about 1, said droplet size distribution being defined as follows:

$$x = \frac{D90 - D10}{D50},$$

wherein

- D90 is a droplet size wherein about 90% by volume of all droplets in said emulsion are equal to or below;
- D10 is a droplet size wherein about 10% by volume of all droplets in said emulsion are equal to or below; and
- D50 is a droplet size wherein about 50% by volume of all droplets in said emulsion are equal to or below.

11. An apparatus according to claim 10, wherein said cylinder has a volume selected to provide, in conjunction with a flow rate of said mixture, a residence time for said mixture in said cylinder of between about 1 to 5 minutes.

12. An apparatus according to claim 10, wherein said plurality of shear means comprises a plurality of blades rotatably positioned serially along said flow path of said mixture.

13. An apparatus according to claim 12, wherein said inlet is positioned substantially concentric with an axis of rotation of said plurality of blades.

14. An apparatus according to claim 13, wherein said cylinder is positioned substantially vertically and said inlet is disposed in a bottom end of said cylinder.

15. An apparatus according to claim 10, further comprising means for forming said mixture of a viscous hydrocarbon, emulsifying additive and water.

16. An apparatus according to claim 15, wherein said means for forming said mixture comprises means for mixing said viscous hydrocarbon and said water at a ratio by volume of hydrocarbon to water of between about 80:20 to 95:5.

* * * * *

UNITED STATES PATENT AND TRADEMARK OFFICE

CERTIFICATE OF CORRECTION

PATENT NO. : 5,399,293

DATED : March 21, 1995

INVENTOR(S) : Gustavo Nunez et al.

It is certified that error appears in the above-identified patent and that said Letters Patent is hereby corrected as shown below:

On the cover page of the patent, under the inventors, please correct the spelling of the second inventor's name from "Roger Marin" to --Roger Marzin--

Signed and Sealed this

Twelfth Day of September, 1995

Attest:

BRUCE LEHMAN

*Attesting Officer*

*Commissioner of Patents and Trademarks*